United States Patent
Schnaufer et al.

(10) Patent No.: US 9,834,252 B2
(45) Date of Patent: Dec. 5, 2017

(54) PROFILE STRIP OF A VEHICLE BODY

(71) Applicant: Bayerische Motoren Werke Aktiengesellschaft, Munich (DE)

(72) Inventors: Thomas Schnaufer, Oberhausen (DE); Andre Koch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/009,056

(22) Filed: Jan. 28, 2016

(65) Prior Publication Data

US 2016/0144899 A1    May 26, 2016

Related U.S. Application Data

(63) Continuation of application No. PCT/EP2014/065224, filed on Jul. 16, 2014.

(30) Foreign Application Priority Data

Jul. 29, 2013    (DE) ........................ 10 2013 214 787

(51) Int. Cl.
*B62D 25/02* (2006.01)
*B62D 29/04* (2006.01)
(Continued)

(52) U.S. Cl.
CPC ......... *B62D 25/025* (2013.01); *B62D 21/157* (2013.01); *B62D 27/026* (2013.01); *B62D 29/002* (2013.01); *B62D 29/043* (2013.01)

(58) Field of Classification Search
CPC .. B62D 25/025; B62D 27/026; B62D 29/043; B62D 29/002; B62D 21/157
See application file for complete search history.

(56) References Cited

U.S. PATENT DOCUMENTS 6,467,834 B1    10/2002    Barz et al.
2001/0020794 A1    9/2001    Ishikawa
(Continued)

FOREIGN PATENT DOCUMENTS

CN    101636308 A    1/2010
CN    201784711 U    4/2011
(Continued)

OTHER PUBLICATIONS

International Search Report (PCT/ISA/210) issued in PCT Application No. PCT/EP2014/065224 dated Dec. 10, 2014 with English translation (five pages).
(Continued)

*Primary Examiner* — Glenn Dayoan
*Assistant Examiner* — Melissa A Black
(74) *Attorney, Agent, or Firm* — Crowell & Moring LLP

(57) ABSTRACT

A profile strip of a vehicle body is provided, wherein the profile strip is configured with at least one shell component made of fiber-reinforced plastic material and with at least one pultrusion component. The profile strip is subjected to bending in a bending direction and the pultrusion component is arranged alongside the shell component, as seen in the bending direction. The pultrusion component is configured with an outer shell and with at least one inner crosspiece, which is coupled to the inside of the outer shell. The at least one inner crosspiece extends in the bending direction and the at least one shell component has additional inner ribs, which extend likewise in the bending direction.

9 Claims, 3 Drawing Sheets

(51) Int. Cl.
  *B62D 29/00* (2006.01)
  *B62D 27/02* (2006.01)
  *B62D 21/15* (2006.01)

(56) References Cited

U.S. PATENT DOCUMENTS

| | | |
|---|---|---|
| 2003/0184126 A1 | 10/2003 | Yamazaki et al. |
| 2010/0109384 A1 | 5/2010 | Carle et al. |
| 2014/0028053 A1* | 1/2014 | Hihara .................. B62D 25/20 296/187.12 |

FOREIGN PATENT DOCUMENTS

| | | |
|---|---|---|
| CN | 103118926 A | 5/2013 |
| DE | 101 00 325 A1 | 7/2001 |
| DE | 100 53 330 A1 | 5/2002 |
| DE | 103 47 598 A1 | 6/2005 |
| DE | 10 2005 043 698 A1 | 3/2007 |
| DE | 10 2006 014 962 A1 | 10/2007 |
| DE | 10 2008 055 738 A1 | 5/2010 |
| DE | 10 2010 012 715 A1 | 9/2011 |
| DE | 10 2010 037 462 A1 | 3/2012 |
| DE | 10 2011 000 450 A1 | 8/2012 |
| DE | 20 2012 012 603 U1 | 8/2013 |
| JP | 2007-30559 A | 2/2007 |
| KR | 1020040019443 A | 3/2004 |

OTHER PUBLICATIONS

German Search Report issued in counterpart German Application No. 10 2013 214 787.2 dated Mar. 27, 2014 with partial English translation (10 pages).

German-language Written Opinion (PCT/ISA/237) issued in PCT Application No. PCT/EP2014/065224 dated Dec. 10, 2014 (five pages).

AVK—Industrievereinigung Verstaerkte Kunststoffe e.V. (Hrsg.): Handbuch Faserverbund-kunststoffe, Grundlagen, Verarbeitung, Anwendungen, 3. Auflage, Vieweg + Teubner (2010), pp. 20, 289-293, 361-369, ISBN 978-3-8348-0881-3 (17 pages).

Chinese-language Office Action issued in counterpart Chinese Application No. 201480052906.6 dated Feb. 28, 2017 with English translation (14 pages).

* cited by examiner

US 9,834,252 B2

PROFILE STRIP OF A VEHICLE BODY

CROSS REFERENCE TO RELATED APPLICATIONS

This application is a continuation of PCT International Application No. PCT/EP2014/065224, filed Jul. 16, 2014, which claims priority under 35 U.S.C. §119 from German Patent Application No. 10 2013 214 787.2, filed Jul. 29, 2013, the entire disclosures of which are herein expressly incorporated by reference.

BACKGROUND AND SUMMARY OF THE INVENTION

The invention relates to a profile strip of a vehicle body, which profile strip is configured with at least one shell component made from fiber-reinforced plastic and at least one pultrusion component, in which the profile strip is subjected to bending in a bending direction and the pultrusion component is arranged next to the shell component in the bending direction. The pultrusion component is configured with an outer shell and at least one inner web which is coupled thereto on the inside. A similar profile strip is known from DE 10 2010 012 715 A1. Furthermore, the invention relates to the use of a profile strip of this type on a vehicle body.

Vehicle bodies of modern vehicles are configured nowadays with fiber-reinforced plastic. The associated profile strips are as thin-walled as possible for weight reasons and then, correspondingly, have a low rigidity and stability. In particular, an optimum between the available supporting force and the weight required to this end therefore has to be found for profile strips of this type.

According to the invention, a profile strip of a vehicle body is provided, the profile strip being configured with at least one shell component made from fiber-reinforced plastic and at least one pultrusion component, in which the profile strip is subjected to bending in a bending direction and the pultrusion component is arranged next to the shell component in the bending direction. The pultrusion component is configured with an outer shell and at least one inner web which is coupled thereto on the inside. The at least one inner web extends in the bending direction, and the at least one shell component additionally has inner ribs which likewise extend in the bending direction.

A shell component made from fiber-reinforced plastic is to be understood to mean a component which is configured from at least one shell made from plastic as a matrix, in particular synthetic resin in the form of polyester resin or epoxy resin, and reinforcing materials or reinforcing fibers embedded therein. Both thermosetting and thermoplastic polymers can be used as a matrix. The relatively inexpensive polyester resins, vinyl ester resins and epoxy resins are used as thermosetting matrix systems. Thermoplastic fiber composite materials can also be produced. Polyamides, polypropylenes and polyethylenes are then predominantly used as matrix systems. Synthetic fibers made from glass, carbon and aramid are predominantly used as reinforcing material, which can be used as rovings, contextures, woven fabrics or nonwovens. In this way, the properties of the shell-shaped component can be varied both in absolute terms and also in terms of their ratio between its longitudinal and transverse direction within a wide range.

A pultrusion component is to be understood to mean a component which has been produced by means of a pultrusion process. Pultrusion processes are also called extrusion processes. A pultrusion system includes a fiber rack, fiber guides, an impregnating device, a shaping or hardening mold, a pull apparatus and a cutting unit. During the pultrusion process, the fiber rovings are guided over fiber guides from a multiple story reel store into the resin bath, the impregnating device. The fibers run through a plurality of pre-shaping stations, with the result that they are adapted to the desired profile shape. At the fiber guides, mats, woven fabrics, contextures or nonwovens can be integrated into the process, in order to adapt/optimize the mechanical properties with respect to a purely unidirectional reinforcement, as is achieved by way of fibers.

A distinction can be made fundamentally between the following three processes for resin impregnation of reinforcing fibers: tub processes, pull-through processes and injection processes.

In the tub process, the reinforcing fibers are introduced from above and are pulled through an open resin bath, in which the fibers are deflected by way of perforated sheets. This process is the most common for producing pultrusion profiles, in particular with simple cross sections. The impregnation takes place in an open resin bath, through which the dry fibers are pulled. The deflection of the fibers into and out of the resin bath takes place by way of guide plates.

The pull-through process is used, in particular, during the production of profiles with geometrically complex cross sections. The reinforcing fibers are guided without deflection through the resin bath, with the result that the impregnating unit is passed through horizontally. Pre-shaping stations which resemble the later profile shape are situated on the inlet and outlet side of the resin bath. The matrix which is stripped off by way of the fiber guides is collected below the impregnating unit with the aid of a trough.

In the injection process, the reinforcing fibers are guided without deflection through the impregnating mold. The mold has the shape of the profile to be produced and widens in the interior. The resin is injected into the cavity from both sides transversely with respect to the fiber direction. This process is particularly preferred in the present case.

After the end of the resin impregnation, final shaping of the produced profile strip and/or hot curing at temperatures between 100° C. to 200° C. preferably then also take/takes place according to the invention.

The finished profile strip is conveyed continuously by way of an adjoining pulling apparatus, for example in the form of a caterpillar take-off or pneumatic grippers, and is pulled out of the mold at a continuous speed (the English name pultrusion therefore also results from "pull" and "extrusion"). A process speed of from 0.1 m/min to 1.2 m/min is preferred.

According to the invention, furthermore, the so-called radius pultrusion is preferred. In contrast to the standard process, in this process the mold, the cavity of which corresponds to the course of the desired profile, is moved step-by-step over the profile which is being produced. The gripper, only one of which is present in this process, holds the profile fixedly during the forward movement of the mold and releases the produced profile again during the reverse movement of the mold, as shown in the figure concerning the process sequence of the radius pultrusion.

By way of the process and its variants, it is possible to produce profiles which are curved in almost any desired manner and, for example, also helical profiles.

The profile strip is subjected to bending in a bending direction on the associated vehicle body, and the pultrusion component is then arranged next to the shell component in the bending direction. Furthermore, the pultrusion component is configured with an outer shell and at least one inner web which is coupled thereto on the inside, the at least one inner web extending in the bending direction. The embodiments of this type are advantageous, in particular, in order to increase the rigidity in a weight-saving manner of a profile strip which is subjected specifically to bending.

Furthermore, in particular, optionally the shell component and/or the pultrusion component can be filled with foam in order to increase the rigidity of the construction according to the invention. The filling with foam advantageously takes place, in particular, after the production of the components in a separate manufacturing step.

Furthermore, the pultrusion component can advantageously be adhesively bonded over the full surface area to the shell component. The full surface area adhesive bonding of this type couples the two components to one another in such a way that a composite component is produced which has correspondingly high strength values.

Furthermore, the invention is directed specifically to the use of a profile strip according to the invention of this type in a passenger compartment of a vehicle body. Here, the sill of the passenger compartment is particularly preferably formed by way of the profile strip. Here, in particular, the available space in the passenger compartment can be utilized in an optimum manner, by the pultrusion component being configured so as to cover the entire height of the shell component.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
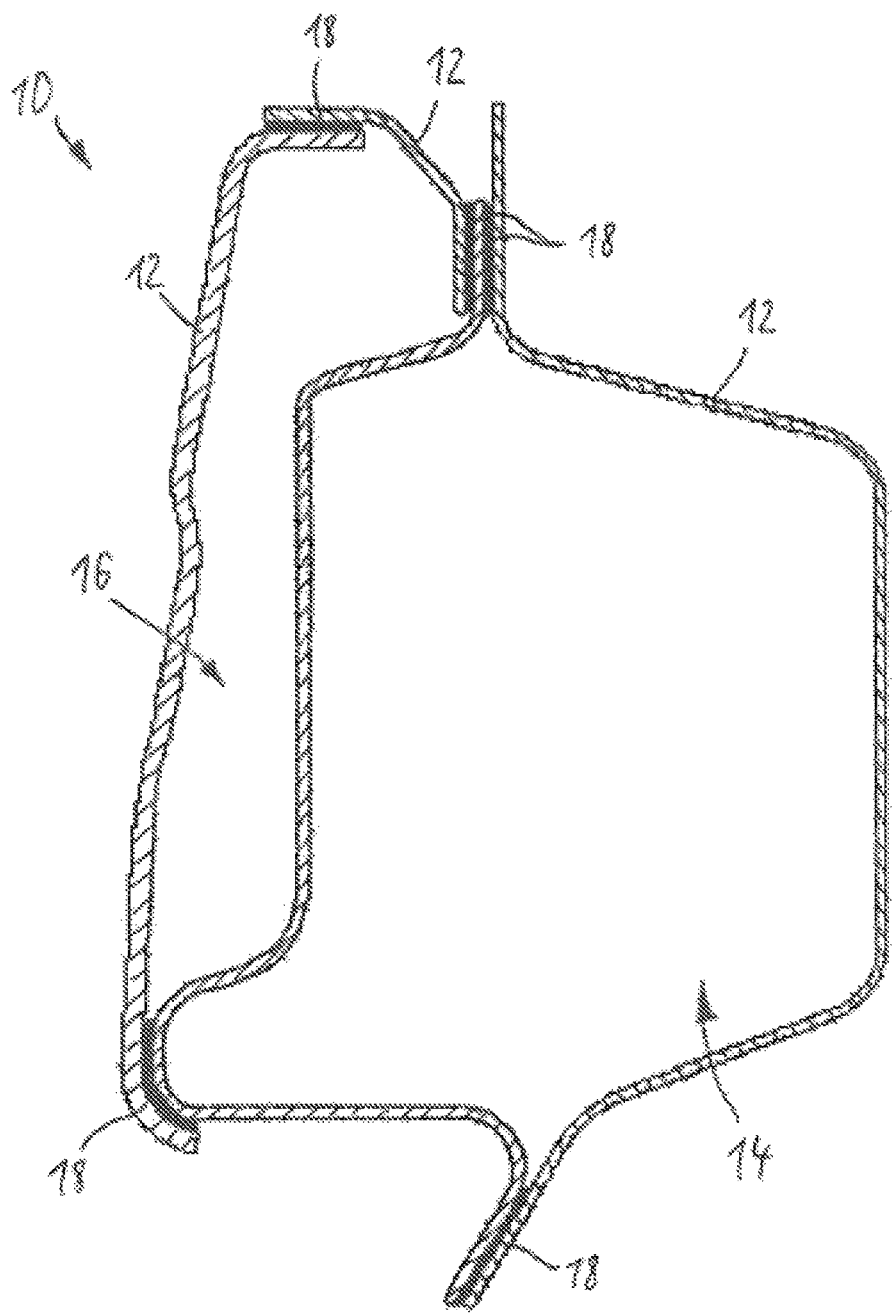
FIG. 1 is a cross section of a profile strip of a vehicle body according to the prior art.

FIG. 1 shows a profile strip 10 in the form of a sill of a passenger compartment of a vehicle body, which profile strip 10 is formed from a total of four elongate shell components 12 made from fiber-reinforced plastic of different curvature. The shell components 12 are configured as flat elements or shells in each case from synthetic resin with associated fiber inserts. In each case, they have a substantially U-shaped or L-shaped curvature such that a total of two closed hollow profiles which are arranged next to one another, a first hollow profile 14 on the right in relation to FIG. 1 and a second hollow profile 16 which is situated on the left next to it, are formed by way of them.

In order to form the respectively closed hollow profiles 14 and 16, the shell components 12 are adhesively bonded to one another at edge regions by use of adhesive faces 18.

FIGS. 2 to 5 show exemplary embodiments of profile strips 10 which likewise have a first hollow profile 14 and a hollow profile 16 which is arranged next to it. Here, the first hollow profile 14 is once again formed from two shell components 12. The shell components 12 are individually of a substantially U-shaped configuration and are laid against one another with their open sides in such a way and their edge regions are adhesively bonded at adhesive faces 18 in such a way that the described hollow profile 14 is produced.

In contrast, the second hollow profile 16 of the exemplary embodiments according to FIGS. 2 to 5 is formed not solely by way of shell components 12, but rather also comprises, in particular, in each case one pultrusion component 20.

Figure 2:
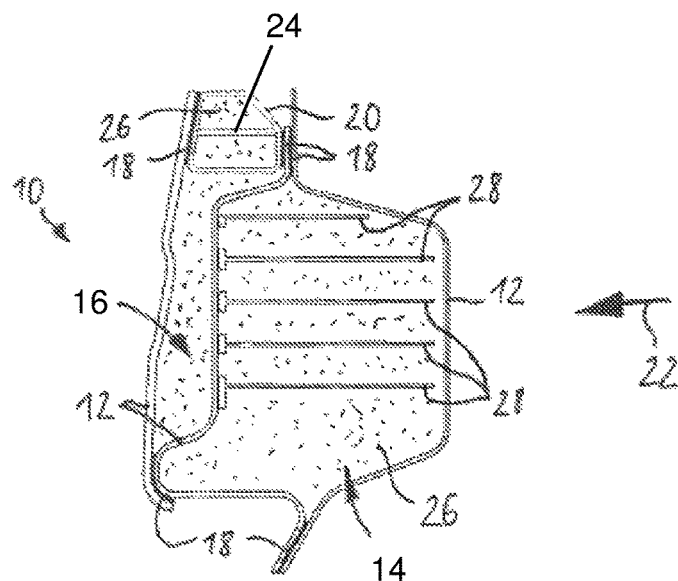
FIG. 2 is a cross section of a first exemplary embodiment of a profile strip of a vehicle body according to the invention.
Figure 3:
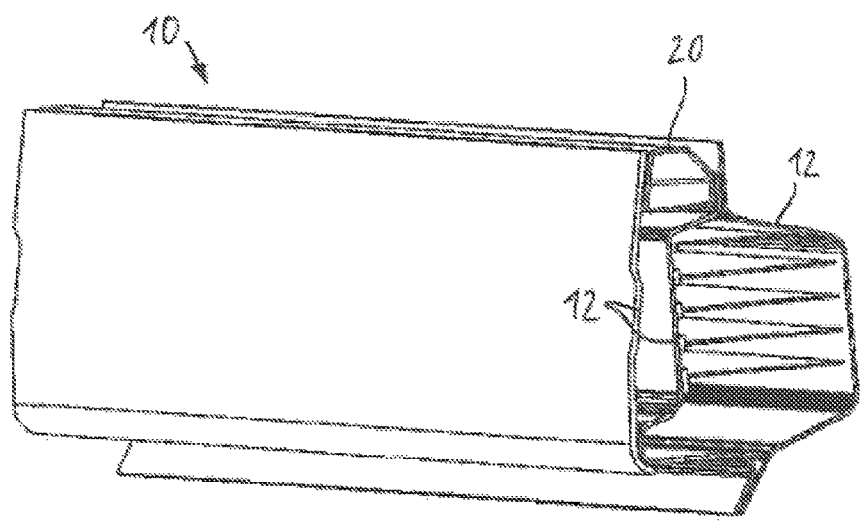
FIG. 3 is a section and perspective view of the profile strip according to FIG. 2.

In the exemplary embodiment according to FIGS. 2 and 3, only the uppermost (in relation to the figure) region of the hollow profile 16 is configured by way of said pultrusion component 20, whereas the rest of the hollow profile 16 is likewise configured by way of a shell component 12 which to this end is adhesively bonded at the top to the pultrusion component 20 and at the bottom to a shell component 12 of the first hollow profile 14. Here, the pultrusion component 20 according to FIGS. 2 and 3 is for its part adhesively bonded to the shell component 12 there by way of an adhesive face 18 in the upper (in relation to the figures) edge region of the first hollow profile 14.

The profile strip 10 of this type is specifically designed to be subjected to a bending force in a bending direction 22, which bending force represents a transverse force on the passenger compartment in the case of a side impact in the present case. Here, the pultrusion component 20 has an inner web 24 for reinforcing it, which inner web 24 extends substantially transversely through its cavity in the bending direction 22.

As is illustrated, in particular, in FIG. 2, both the hollow profile 14 and the hollow profile 16 can be filled with foam 26 for further reinforcement of the profile strip 10 of this type, and at least one of the hollow profiles, the hollow profile 14 in the present case, can have additional inner ribs 28 which likewise extend in the bending direction 22, in particular.

Figure 4:
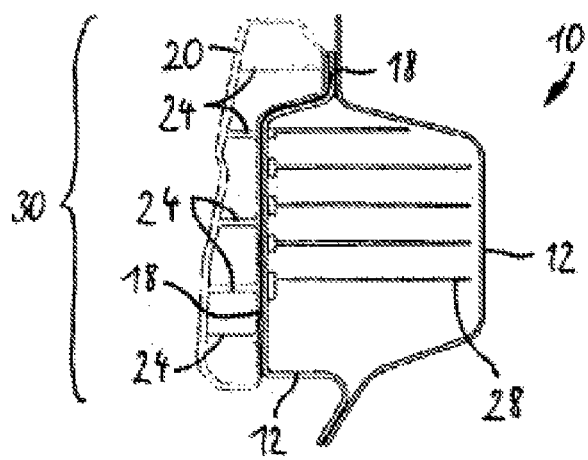
FIG. 4 is a cross section of a second exemplary embodiment of a profile strip of a vehicle body according to the invention.
Figure 5:
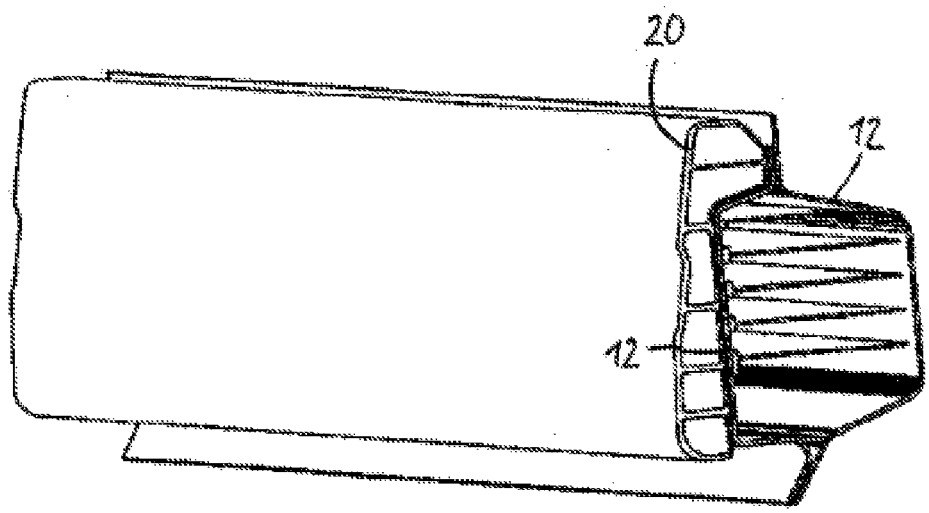
FIG. 5 is a section and perspective view of the profile strip according to FIG. 4.

FIGS. 4 and 5 illustrate an exemplary embodiment of a profile strip 10 according to the invention, in which the second hollow profile 16 is formed completely by a pultrusion component 20 which extends over the entire height 30 of the shell component 12 which is situated next to it. The pultrusion component 20 of this type is adhesively bonded over its entire height by use of an adhesive face 18 to the adjacent shell component 12 and, in its interior, has a total of five inner webs 24 which all extend parallel to one another in the bending direction 22.

LIST OF DESIGNATIONS

10 Profile strip
12 Shell component
14 First hollow profile
16 Second hollow profile
18 Adhesive face
20 Pultrusion component
22 Bending direction
24 Inner web
26 Foam
28 Rib
30 Height of the shell component The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A profile strip of a vehicle body, the profile strip comprising:
   at least one shell component made of a fiber-reinforced plastic;
   at least one pultrusion component arranged next to the shell component in a bending direction in which the profile strip is subjectable to bending, wherein
   the pultrusion component is configured with an outer shell and at least one inner web coupled thereto on an inner side of the outer shell,
   the at least one inner web extends in the bending direction, and
   the at least one shell component has inner ribs extending in the bending direction, wherein
      the outer shell of the pultrusion defines a hollow cavity within which the at least one inner web is disposed.

2. The profile strip according to claim 1, further comprising foam filling an inner cavity of the shell component and/or the pultrusion component.

3. The profile strip according to claim 2, wherein the pultrusion component is adhesively bonded to the shell component over a full surface area adjacent to the shell component.

4. The profile strip according to claim 1, wherein the pultrusion component is adhesively bonded to the shell component over a full surface area adjacent to the shell component.

5. The profile strip according to claim 1, wherein the profile strip is part of a passenger compartment of the vehicle body.

6. The profile strip according to claim 4, wherein the profile strip is part of a passenger compartment of the vehicle body.

7. The profile strip according to claim 5, wherein a sill of the passenger compartment is formed by the profile strip.

8. The profile strip according to claim 6, wherein a sill of the passenger compartment is formed by the profile strip.

9. The profile strip according to claim 7, wherein the pultrusion component is configured to cover an entire height of the shell component.

* * * * *